L. H. FLANDERS.
WOOD SEPARATOR FOR SECONDARY BATTERIES.
APPLICATION FILED OCT. 21, 1908.
963,216.
Patented July 5, 1910.
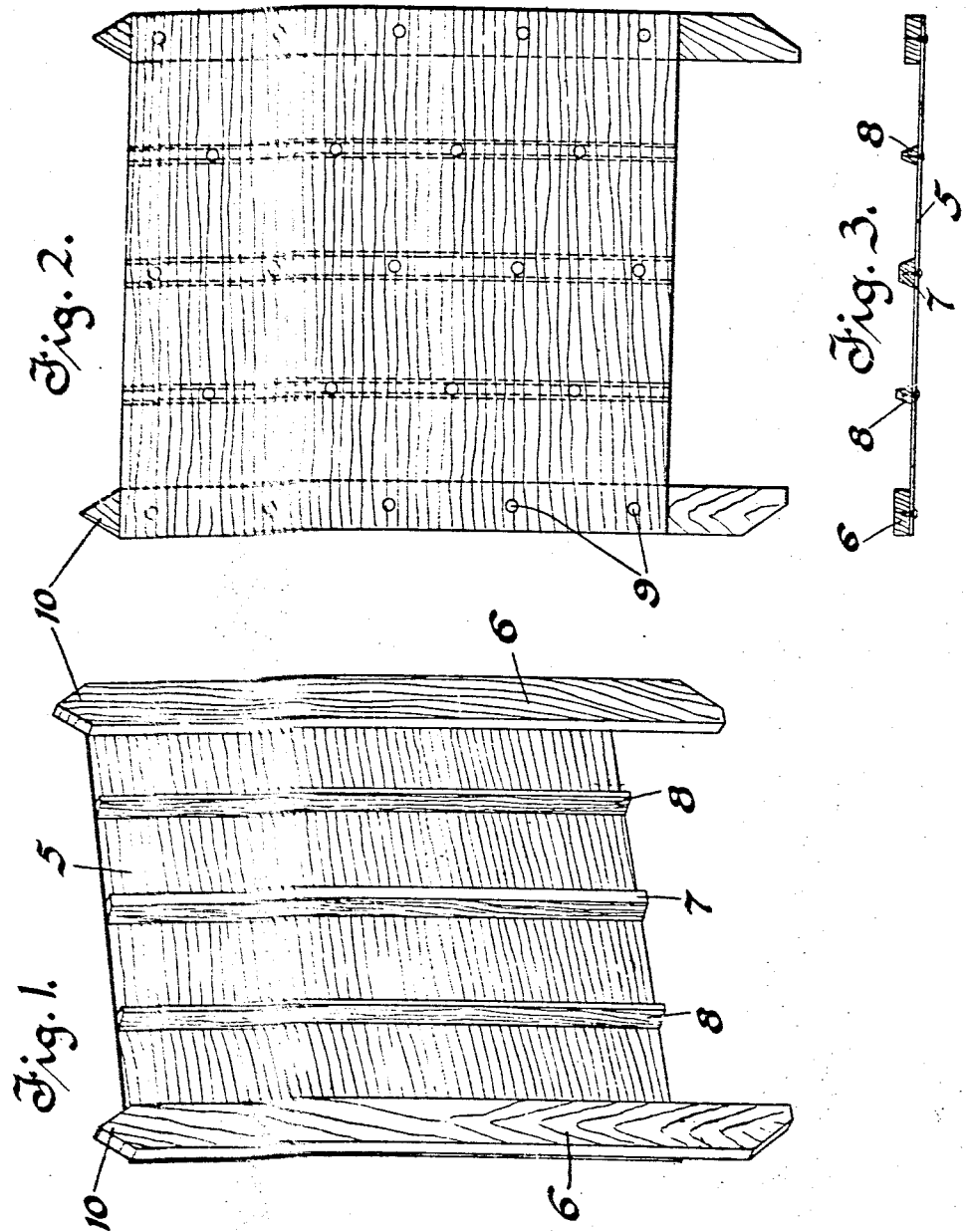

UNITED STATES PATENT OFFICE.

LOUIS H. FLANDERS, OF EDGEWOOD PARK, PENNSYLVANIA, ASSIGNOR, BY MESNE ASSIGNMENTS, TO THE ELECTRIC STORAGE BATTERY COMPANY, OF PHILADELPHIA, PENNSYLVANIA, A CORPORATION OF NEW JERSEY.

WOOD SEPARATOR FOR SECONDARY BATTERIES.

963,216.      Specification of Letters Patent.      Patented July 5, 1910.

Application filed October 21, 1908. Serial No. 458,839.

*To all whom it may concern:*

Be it known that I, LOUIS H. FLANDERS, a citizen of the United States, and a resident of Edgewood Park, in the county of Allegheny and State of Pennsylvania, have made a new and useful Invention in Wood Separators for Secondary Batteries, of which the following is a specification.

This invention relates to secondary batteries and more particularly for separators for the electrodes of said batteries.

An object of my invention is the production of a separator which is simple in construction, light, effective and comparatively cheap to build.

Various materials have been utilized for constructing separators and various shaped separators have been employed with more or less satisfactory results. Thin perforated plates have been utilized which were reinforced with stiff ribs formed integrally therewith or otherwise secured to them. The electrodes have been inclosed within sheaths made of thin rubber sheets provided with perforations and reinforced along their edges so as to maintain their shape, but wood separators, to the best of my knowledge, have given the best results as far as the function of separating the electrodes and preventing short circuits between them is concerned. A great many mechanical defects have, however, been encountered with wooden separators. As ordinarily constructed, they are flimsy and difficult to handle. They also corrugate and distort when placed in the cell, making inspection difficult.

The specific object of my invention has been to provide a wood separator which overcomes all the difficulties previously encountered.

In the drawings accompanying this application and forming a part thereof, I have illustrated an embodiment of my invention.

Figure 1 is a perspective view of a separator embodying my invention; Fig. 2 is a side elevation of the separator shown in Fig. 1; and, Fig. 3 is an end view of Fig. 2.

The separator consists of a sheet of wood veneer which is reinforced by ribs which extend across the grain of the veneer and which are secured in place by means of lead tacks.

A sheet of wood veneer 5 is cut to the proper shape and is provided along its lateral edges with reinforcing ribs 6. These ribs extend above and below the sheet of veneer and are adapted to support the separator when it is located within the cell of a secondary battery and between the electrodes of the battery. The lower ends of the ribs are adapted to be supported by the bottom of the cell and to project between the edges of the electrodes to be separated. The thickness of these ribs is a little less than the desired separation. An intermediate rib 7 extends parallel to the rib 6 and is located midway between them. Lighter ribs 8 are located on each side of the rib 7 and extend parallel to it. All of the ribs are secured to the wood veneer sheet by means of lead tacks 9 which are suitably spaced and of sufficient length to hold the ribs securely in place. The veneer sheet is of such length that it extends above and below the top and bottom edges respectively of the electrode which is located adjacent to it and it is of such width that the heavy ribs 6 extend beyond the edges of the plate in close proximity to the sides of the container jar. This construction insures that the edges of the electrodes are rigidly held in position by the heavy ribs 6 and are prevented from curling or twisting beyond the edges of the separator and it also effectively prevents bridging of active material across adjacent electrodes at their edges. The fact that the ribs extend across the grain of the veneer sheet insures a relative rigid separator and one that is easy to handle and to secure in place within the cell. Furthermore, the ribs, being mechanically fastened to the veneer sheet, are positively held in place and the life of the separator is as long as the life of the electrode which it separates.

The upper ends of the ribs 6 are pointed, as shown at 10 in the drawings, so as to prevent a deposition of active material at that point and a subsequent bridging between adjacent plates.

The wood veneer and the ribs are treated so as to remove any organic substances that might injure the electrodes and consequently it is necessary to keep the separators wet prior to installing them in order to prevent shrinkage and subsequent cracking.

The separator may be made of any porous substance of suitable character and the stiffening ribs may be located on each side of the veneer sheet. With such a construction the tacks or nails will extend through one set of ribs and the veneer and into the ribs on the other side of the veneer. When the separators are located in place within the cell, the opposed ends or heads of the tacks 9 are located adjacent to the negative plates. This prevents corrosion of the tacks.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim is:

1. A separator for secondary battery plates comprising a sheet of wood veneer, wood stiffening ribs, the grain of which extends across the grain of said sheet, and lead tacks for securing said stiffening ribs to the sheet.

2. A separator for secondary batteries comprising a sheet of wood veneer, wood stiffening ribs extending across the grain of the sheet, the grain of the ribs being across the grain of the sheet, said ribs projecting beyond the edges of said sheet, and lead tacks for securing said ribs to said sheet.

3. A separator for secondary battery plates comprising a sheet of wood veneer, wood stiffening ribs, the grain of which extends across the grain of said sheet, and fastening devices for securing said ribs to the sheet, said fastening devices consisting entirely of material which will resist the action of the electrolyte.

In testimony whereof, I have hereunto subscribed my name this 20th day of October, 1908.

LOUIS H. FLANDERS.

Witnesses:
C. W. McGHEE.
E. W. McCALLISTER.